(12) United States Patent
Gruhn et al.

(10) Patent No.: US 10,603,872 B2
(45) Date of Patent: Mar. 31, 2020

(54) PROCESS FOR PRODUCING A METAL-PLASTIC HYBRID COMPONENT

(71) Applicants: Maximilian Gruhn, Marl (DE); Karl Kuhmann, Duelmen (DE); Martin Risthaus, Olfen (DE)

(72) Inventors: Maximilian Gruhn, Marl (DE); Karl Kuhmann, Duelmen (DE); Martin Risthaus, Olfen (DE)

(73) Assignee: Evonik Operations GmbH, Essen (DE)

( * ) Notice: Subject to any disclaimer, the term of this patent is extended or adjusted under 35 U.S.C. 154(b) by 458 days.

(21) Appl. No.: 14/764,348

(22) PCT Filed: Jan. 29, 2014

(86) PCT No.: PCT/EP2014/051693
§ 371 (c)(1),
(2) Date: Jul. 29, 2015

(87) PCT Pub. No.: WO2014/118211
PCT Pub. Date: Aug. 7, 2014

(65) Prior Publication Data
US 2015/0361304 A1    Dec. 17, 2015

(30) Foreign Application Priority Data

Jan. 29, 2013 (DE) .................. 10 2013 201 388

(51) Int. Cl.
| | |
|---|---|
| C09J 7/00 | (2018.01) |
| B32B 7/12 | (2006.01) |
| C09J 177/00 | (2006.01) |
| B32B 5/26 | (2006.01) |
| B32B 27/06 | (2006.01) |
| B32B 27/12 | (2006.01) |
| B32B 21/08 | (2006.01) |
| B32B 15/088 | (2006.01) |
| B32B 21/10 | (2006.01) |
| B32B 27/34 | (2006.01) |
| C09J 177/02 | (2006.01) |
| C09J 177/06 | (2006.01) |
| C08G 18/80 | (2006.01) |
| C08G 18/79 | (2006.01) |
| C08G 18/00 | (2006.01) |
| B32B 17/06 | (2006.01) |
| C08L 63/00 | (2006.01) |
| B29C 45/14 | (2006.01) |

(Continued)

(52) U.S. Cl.
CPC .......... *B32B 7/12* (2013.01); *B29C 45/14311* (2013.01); *B29C 45/1671* (2013.01); *B32B 5/26* (2013.01); *B32B 15/08* (2013.01); *B32B 15/088* (2013.01); *B32B 15/14* (2013.01); *B32B 17/064* (2013.01); *B32B 21/04* (2013.01); *B32B 21/08* (2013.01); *B32B 21/10* (2013.01); *B32B 27/06* (2013.01); *B32B 27/12* (2013.01); *B32B 27/34* (2013.01); *B32B 37/12* (2013.01); *C08G 18/003* (2013.01); *C08G 18/798* (2013.01); *C08G 18/8061* (2013.01); *C08L 63/00* (2013.01); *C09J 5/02* (2013.01); *C09J 7/00* (2013.01); *C09J 177/00* (2013.01); *C09J 177/02* (2013.01); *C09J 177/06* (2013.01); *B29C 2045/14868* (2013.01); *B29K 2705/00* (2013.01); *B32B 2037/1215* (2013.01); *B32B 2255/06* (2013.01); *B32B 2255/26* (2013.01); *B32B 2255/28* (2013.01); *B32B 2262/101* (2013.01); *B32B 2262/106* (2013.01); *B32B 2307/31* (2013.01); *B32B 2451/00* (2013.01); *B32B 2457/00* (2013.01); *B32B 2605/08* (2013.01); *B32B 2605/18* (2013.01); *B32B 2607/00* (2013.01); *C09J 2463/00* (2013.01); *C09J 2477/00* (2013.01); *Y10T 428/31511* (2015.04); *Y10T 428/31515* (2015.04)

(58) Field of Classification Search
CPC ..................................... C09J 7/00; B32B 7/12
See application file for complete search history.

(56) References Cited

U.S. PATENT DOCUMENTS

| | | | |
|---|---|---|---|
| 4,053,682 A | 10/1977 | Donermeyer | |
| 4,252,712 A * | 2/1981 | Donermeyer | ........ C08G 63/672 523/218 |

(Continued)

FOREIGN PATENT DOCUMENTS

| | | |
|---|---|---|
| CN | 102448718 A | 5/2012 |
| DE | 10 2007 025 152 A1 | 12/2008 |

(Continued)

OTHER PUBLICATIONS

Office Action dated Mar. 21, 2017 in Korean Patent Application No. 10-2015-7023143 (submitting partial English translation only).

(Continued)

*Primary Examiner* — Daniel H Lee
(74) *Attorney, Agent, or Firm* — Oblon, McClelland, Maier & Neustadt, L.L.P.

(57) ABSTRACT

The invention provides a process for producing a hybrid component comprising metal and plastic. The process comprises the steps of a) pretreating the metal surface by applying at least one conversion layer, b) applying at least one layer of an adhesion promoter composition and c) bonding the metal to the plastic. The adhesion promoter composition comprises at least one copolyamide-based hot-melt adhesive.

14 Claims, No Drawings

(51) Int. Cl.
*B29C 45/16* (2006.01)
*B32B 15/08* (2006.01)
*C09J 5/02* (2006.01)
*B32B 15/14* (2006.01)
*B32B 21/04* (2006.01)
*B32B 37/12* (2006.01)
*B29K 705/00* (2006.01)

(56) References Cited

U.S. PATENT DOCUMENTS

| | | | |
|---|---|---|---|
| 9,205,630 B2 | 12/2015 | Pawlik et al. | |
| 2007/0163709 A1 | 7/2007 | Risthaus et al. | |
| 2009/0162544 A1* | 6/2009 | Garesche | B05D 7/16 427/202 |
| 2010/0143602 A1 | 6/2010 | Heft et al. | |
| 2011/0284156 A1* | 11/2011 | Prenzel | B05D 1/286 156/256 |
| 2012/0070670 A1* | 3/2012 | Pawlik | B32B 7/12 428/416 |

FOREIGN PATENT DOCUMENTS

| | | |
|---|---|---|
| DE | 10 2008 061 166 A1 | 7/2010 |
| DE | 10 2010 011 914 A1 | 10/2010 |
| DE | 10 2009 042 103 A1 | 3/2011 |
| EP | 1 808 468 A2 | 7/2007 |
| EP | 1 808 468 A3 | 7/2007 |
| JP | 10-193455 A | 7/1998 |
| JP | 2008-537912 A | 10/2008 |
| JP | 2009-209392 A | 9/2009 |
| JP | 2009-280888 A | 12/2009 |
| JP | 2012-528211 A | 11/2012 |
| WO | WO 2010/136241 A1 | 12/2010 |
| WO | WO 2013/104397 A2 | 7/2013 |

OTHER PUBLICATIONS

International Search Report dated Feb. 27, 2014 in PCT/EP2014/051693.

* cited by examiner

PROCESS FOR PRODUCING A METAL-PLASTIC HYBRID COMPONENT

The present invention relates to a process for producing a hybrid component comprising metal and plastic, to a coating for hybrid components and to the use thereof, to hybrid components and to metal substrates.

Hybrid components (or structural components) are composites of two materials: metal and plastic. They can be produced by the injection moulding process.

Hybrid components are components used inter alia in vehicle construction and in aircraft construction and also in electronics and electrical engineering in the field of load-bearing parts and of parts that absorb forces, or as part of a housing, for example for decorative purposes. A particular feature of these is that they comprise local reinforcement systems which give the component particular mechanical properties and/or provide the possibility of functional integration. A feature requiring particular emphasis is increased component stiffness with additional weight reduction in comparison with components hitherto used in a conventional mode of construction.

The abovementioned application sectors increasingly use hybrid components in order to reduce mass and at the same time obtain optimized mechanical properties. The disadvantage of these hybrid components is lack of, or inadequate, adhesion between metal and plastic. Mechanical methods have therefore hitherto been used to anchor the plastic to the metal.

Adhesion between metal and plastic can be improved by using adhesion promoters. EP-A-1808468 and EP-A-2435246 disclose hybrid components where the bond between metal and plastic uses hotmelt adhesives in the form of copolyamide-based adhesion promoters additionally comprising isocyanate groups and epoxy groups.

In particular in the automobile sector there are known metal substrates which comprise conversion coats, these being used for surface treatment. The coats are produced on the surface by way of example by a phosphating or chromating process.

The adhesion between metal and plastic in the hybrid components of the prior art is not yet adequate to comply with mass-production requirements, for example in the automobile sector. The inadequate adhesion is associated by way of example with the incompatibility between many plastics and various metals, or the varying chemical and physical nature of the substrate surfaces resulting from oxidation and corrosion processes due to natural or other environmental effects.

The problem addressed was consequently that of providing a novel process which does not have the disadvantages of the prior art. Accordingly, the intention was that the hybrid components obtainable by the process have, in comparison with the prior art, improved or increased adhesion between metal and plastic. A further intention was that the resultant hybrid components comply with the requirements of vehicle construction and of aircraft construction, and also those of the electronics industry and electrical-engineering industry. A further intention was to provide good weathering resistance, in particular corrosion resistance. Metal and plastic in the hybrid component were to be cohesively bonded to one another.

Accordingly, a process of the type mentioned in the introduction has been found, and it is thus possible to provide hybrid components which have improved adhesion between metal and plastic. The process according to the invention comprises the steps of:

a. pretreating the metal surface by applying at least one conversion layer,
b. applying at least one layer of an adhesion promoter composition and
c. bonding the metal to the plastic, wherein the adhesion promoter composition comprises at least one copolyamide-based hotmelt adhesive.

In the process according to the invention, the metal surface is first pretreated over the full area or partially. The metal may be cleaned before the pretreatment, or can already have metallic protective coatings. The metal cleaning process is known to the person skilled in the art.

The pretreatment may use converting agents. The converting agents are usually used in the form of aqueous solutions. Converting agents that can be used are commercially available passivating agents and products for conversion treatment, for example zinc phosphating agents, iron phosphating agents, and also phosphoric acid solutions comprising titanates or zirconates. From a technical point of view it is likewise possible to use chromating agents, but these are less preferred because they are hazardous to health.

Preferably, converting agents comprise halides. Halides are regarded as being salt-type, covalent and complex compounds of the halogens fluorine, chlorine, bromine and iodine with more strongly electropositive elements, preference being given to halide salts, complex halides or mixtures of these halides. Halides are salt-type substances of alkali metal and alkaline earth metal salts and ammonium salts of the hydrohalic acids. In the complex halides, halogen ions occur as monodentate anionic ligands.

Further preferred are fluorine-containing halides. Particularly preferred fluorine-containing halide salts are fluoride anions or hydrogenfluoride anions, for example hydrogendifluoride.

In the complex halide ions, it is preferable for transition group elements, preferably titanium or zirconium, to form the central atom. Complex halides contain, for example, hexafluorotitanate anions, hexafluorozirconate anions or mixtures thereof.

The complex halides are present preferably in a proportion of 0.2% to 10% by weight, preferably 0.5% to 8% by weight, based on the total weight of aqueous converting agent solution. Suitable converting agents are sold, for example, by Henkel, Germany, under the Granodine name. The halide salts are preferably present in a proportion of 10 to 300 ppm, preferably 20 to 200 ppm and more preferably 30 to 100 ppm, based in each case on the total weight of the converting agent solution.

Fluoride-containing solutions comprising fluoride and hydrogendifluoride are supplied, for example, under the Grano Toner 38 name by Henkel.

To produce the conversion layer, the metal may be dipped into the converting agent. In addition, the converting agent may be applied by means of spraying, bar coating, rolling, pressing, dipping, casting or laminating.

After the pretreatment, it is possible to conduct a post-passivation operation. This is understood to mean a passivating rinse with acidic solutions, preferably using the aforementioned halides.

It is moreover possible to obtain the conversion layer by flame pyrolysis deposition of amorphous silicate on the surface of the metal. The surface to be treated is passed through the oxidizing region of a gas flame into which a silicon-containing substance, the precursor, has been dosed. This is consumed by combustion, and the residue deposits in the form of amorphous silicate as firmly adhering layer in layer thicknesses of about 20 to 40 nm on the surface.

Treatment of a surface is achieved by using an operating gas to produce a plasma jet or a combustion gas to produce a flame jet, this being used to coat the surface, where at least one precursor material is introduced into the operating gas and/or into the plasma jet or into the combustion gas and/or into the flame jet, and is reacted in the plasma jet or flame jet, where at least one reaction product of at least one of the precursors is deposited on the surface and/or on at least one layer arranged on the surface. A process of this type is described by way of example in DE-A-102009042103.

The surface can be treated at atmospheric pressure. In addition, by means of a spectrometer, optical emissions of the plasma jet or flame jet can be measured, which can be used to determine characteristics of the plasma jet or flame jet.

The treatment of the surface may consist in an activation or in a coating of the surface by means of the plasma jet or flame jet.

More particularly, the throughputs of operating gas and precursor can be controlled and/or regulated independently of one another. As well as the distance of the plasma source from the surface to be coated, a further means is thus available for influencing the layer properties, for example the layer thickness or refractive index. In this way, it is likewise possible to achieve gradient layers. Through suitable choice of these process parameters and the precursors used, the following properties of the surface of the substrate, for example, can be altered in a controlled manner: scratch resistance, self-healing capacity, barrier characteristics, reflection characteristics, transmission characteristics, the refractive index, transparency, light scattering, electrical conductivity, antibacterial characteristics, friction, adhesion, hydrophilicity, hydrophobicity, oleophobicity, surface tension, surface energy, anticorrosive action, soil repellency, self-cleaning capacity, photocatalytic characteristics, antistress characteristics, wear characteristics, chemical durability, biocidal characteristics, biocompatible characteristics, electrostatic characteristics, electrochromic activity, photochromic activity, gasochromic activity.

The plasma can be produced in a free-jet plasma source. In this method, a high-frequency discharge is triggered between two concentric electrodes, and the hollow cathode plasma that forms is conducted as a plasma jet, by means of an introduced gas stream, out of the electrode arrangement and generally several centimetres into the free space and toward the surface to be coated. The precursor may be introduced either into the operating gas prior to the discharge being triggered (direct plasma processing) or thereafter into the plasma already formed or into the proximity thereof (remote plasma processing). A further option for plasma generation is the exploitation of a dielectrically hindered discharge. This involves passing the operating gas which serves as dielectric, especially air, between two electrodes. The plasma discharge is effected between the electrodes, which are fed with high-frequency high voltage.

The precursor is preferably introduced into the operating gas or the plasma stream in the gaseous state or as an aerosol. It is likewise possible to use liquid or solid precursors, especially pulverulent precursors, but they are preferably converted to the gaseous state before being introduced, for example by vaporization. The precursor can likewise first be introduced into a carrier gas, be entrained thereby and be introduced into the operating gas or the plasma stream together therewith.

The deposited layer preferably comprises at least one of the following components: silicon, silver, gold, copper, iron, nickel, cobalt, selenium, tin, aluminium, titanium, zinc, zirconium, tantalum, chromium, manganese, molybdenum, tungsten, bismuth, germanium, niobium, vanadium, gallium, indium, magnesium, calcium, strontium, barium, lithium, lanthanides, carbon, oxygen, nitrogen, sulphur, boron, phosphorus, fluorine, halogens and hydrogen. More particularly, the layers contain oxidic or/and nitridic compounds of silicon, titanium, tin, aluminium, zinc, tungsten and zirconium.

The precursor used is preferably an organosilicon compound and/or an organotitanium compound, for example hexamethyldisiloxane, tetramethylsilane, tetramethoxysilane, tetraethoxysilane, titanium tetraisopropoxide or titanium tetraisobutoxide.

In this way, it is possible, for example, to achieve barrier layers which reduce permeability to gases and water.

Operation gases used may be air, steam or another gas, for example oxygen, nitrogen, noble gases, hydrogen, carbon dioxide, gaseous hydrocarbons or a mixture thereof.

The fuel gas used for the flaming may, for example, be propane, in which case air or oxygen is supplied for combustion. The fuel gas may be premixed with air or oxygen. The mixing ratio between fuel gas and oxygen or air may also be controlled and/or regulated as a parameter with reference to the characteristics determined.

The plasma can be produced in a free-jet plasma source or by means of dielectrically hindered discharge.

The precursor is preferably introduced into the operating gas or the plasma stream in the gaseous state or as an aerosol. It is likewise possible to use liquid or solid precursors, especially pulverulent precursors, but they are preferably converted to the gaseous state before being introduced, for example by vaporization. The precursor can likewise first be introduced into a carrier gas, be entrained thereby and be introduced into the operating gas or the plasma stream together therewith.

The precursor used is preferably an organosilicon compound and/or an organotitanium compound, for example hexamethyldisiloxane, tetramethylsilane, tetramethoxysilane, tetraethoxysilane, titanium tetraisopropoxide or titanium tetraisobutoxide.

In a preferred embodiment, a first layer with a barrier action is produced, and then at least one further layer as functional layer.

After the conversion layer has been dried, the adhesion promoter composition is applied to the metal or the conversion layer, over the full area or partially. The metal with the applied adhesion promoter composition can be crosslinked and dried thermally, advantageous object temperatures being from 120° C. to 240° C., preferably from 150° C. to 225° C., more preferably from 175° C. to 200° C., for a period of 0.5 min to 30 min, preferably 1 min to 20 min, more preferably 3 min to 10 min. The person skilled in the art can determine suitable time/temperature conditions via preliminary tests. In roll processes, preferred peak metal temperatures (PMT) are from 180° C. to 230° C. The person skilled in the art will set the system or belt speed accordingly so as to achieve the PMT.

The compositions are thus cured thermally.

The compositions can be applied continuously or batchwise by means of electrophoretic enamelling, electrostatic spray processes, fluidized-bed sintering, roll processes (for example coil coating), casting, jet processes and spraying, lamination, (hot) pressing, or (co)extrusion, preference being given here to spray processes and application processes using rolls. The compositions of the invention here can be applied on one or both sides, locally or over an entire area. The stoved layer thicknesses (dry layer thicknesses) of the adhesion promoter compositions may be from 10 to 1000 µm, preferably 20 to 250 µm, and more preferably 30 to 150 µm. Preferred layer thicknesses in roll processes are from 5 µm to 250 µm, in particular from 10 µm to 50 µm.

The plastic is then applied to the metal, for example by means of an injection moulding process or by hot pressing, and the metal is physically and/or chemically bonded to the plastic. Injection moulding technology is preferably used to inject the plastic. For this purpose, the coated metal part is inserted into the injection mould and, after closing of the mould, is coated in the mould with the plastic. Contact of the plastics melt with the coated metal surface produces a cohesive bond and adhesion between the components. The cohesively bonded hybrid component can then be demoulded from the injection mould and subjected to further processing or further mechanical operations.

The combination of metal and plastic can then be subjected to a heat treatment for from 2 min to 90 min, preferably from 5 min to 60 min, at from 150° C. to 230° C., in order to increase bond strength and degree of crosslinking. A cohesive bond between the plastic and the metal is thus achieved. Hybrid components produced in this way have durable bonding between the pretreated and coated metal and the plastic, and exhibit high mechanical and dynamic strength.

Examples of suitable metals are iron-containing alloys such as steel, aluminium, copper, magnesium, titanium, and also alloys of the abovementioned metals. Preferred metals are steel, titanium, aluminium, and also alloys of the abovementioned metals, particular preference being given to steel and aluminium, and aluminium alloys.

Preferred steels are unalloyed steels and stainless steels. Steels with a protective coating are particularly preferred. Suitable coatings are by way of example coatings made of zinc, aluminium-silicon, aluminium-zinc, zinc-aluminium, zinc-iron or zinc-magnesium, preference being given here to aluminium-silicon, zinc-aluminium and zinc. The composition of the coatings is defined by way of example in the brochure "Schmelztauchveredeltes Band and Blech" [Hot-dip-coated Strip and Sheet] from the Steel Information Centre in the Stahl-Zentrum, Düsseldorf, Germany, 2010 Edition.

Before the application of the plastic, the coated metal can be subjected to a trimming, shaping or forming process. The shaping or forming process may precede or follow the application of the aforementioned compositions.

The plastic can be applied to the coated metal in a known manner, e.g. by injection moulding, compression, lamination, in-mould coating or (co)extrusion. Injection moulding technology is preferably used to inject the plastic. The metal provided with the inventive coatings may have been subjected to preconditioning in the range from 50° C. to 250° C. in order to raise the temperature in the region of contact with the plastic, for example in the case of in-mould coating or in the case of coextrusion, for good bonding between the adhesion promoter and the plastic.

Suitable plastics comprise by way of example polybutylene terephthalates, polyolefins, polycarbonates, polyurethanes, aliphatic or semiaromatic polyamides, plastics mixtures comprising polyamides, styrene polymers such as acrylonitrile-butadiene-styrene, polyalkyl(meth)acrylates such as polymethylmethacrylate, and also mixtures of the abovementioned plastics. Mixtures of polycarbonates and acrylonitrile-butadiene-styrene are likewise suitable. Preference is given to aliphatic or semiaromatic polyamides, plastics mixtures comprising polyamides, polybutylene terephthalates, polyolefins, and also mixtures of the abovementioned plastics, particular preference being given here to polyamides. The plastics have preferably been reinforced (reinforcers), for example fibre-reinforced, preference being given to glass fibre—(GF) or carbon fibre-reinforced (CF) plastics. The plastics may additionally comprise fillers such as talc powder or chalk. The plastics may further comprise additives, for example stabilizers, impact modifiers, flow aids and pigments.

Preferred polyamides (PA) are selected from the group consisting of nylon-6, nylon-6,6, nylon-6,10, nylon-6,12, nylon-6,13, nylon-6,14, nylon-10,6, nylon-10,10, nylon-10,12, nylon-12,12, nylon-11, nylon-12, polyphthalamides and mixtures based on these polyamides. Particularly preferred polyamides are selected from nylon-6, nylon-6,6, nylon-6,10, nylon-10,10, and mixtures of these. The polyamides preferably contain reinforcers.

The invention further provides a coating for hybrid components, comprising at least one conversion layer and at least one layer of the aforementioned adhesion promoter composition (adhesion promoter layer). The coating is obtainable by the process according to the invention.

The inventive coatings can be used as adhesion promoter between metal and plastic in a hybrid component.

The invention further provides hybrid components wherein the metal has been bonded to the plastic at least by an inventive coating. The hybrid components of the invention are used by way of example in mechanical engineering and plant engineering, vehicle construction, the airline industry, in railway engineering, in electronics or electrical engineering. Typical applications are in the field of automobile interiors, of bumpers, of loadbearing bodywork structures, as frame parts and bodywork parts such as front-end members, door components, roof components, floor components or chassis components, or as electronics housing. Equally suitable application sectors are frames, profiles, façade elements or guide strips for windows and doors in the field of house construction and architecture.

The invention further provides a metal substrate coated with at least one inventive coating. The substrate can by way of example be a semifinished metallic product or a metallic moulding. It is preferable that the substrate is a metal strip, a metal panel, a metal profile, a cast metal part or a metal wire.

Adhesion Promoter Composition

The adhesion promoter composition comprises at least one copolyamide-based hotmelt adhesive. The adhesion promoter composition can be present in solution or in dispersion, or in the form of solid.

The hotmelt adhesive comprises at least one copolyamide. The copolyamide can be produced from amide monomers and from comonomers. The comonomers are preferably used to obtain copolyamides with a melting point from 95° C. to 175° C.

The amide monomers are preferably selected from the group consisting of laurolactam, aminoundecanoic acid and mixtures thereof. Particular preference is given to copolyamides based on laurolactam.

The comonomers are preferably selected from aliphatic or cycloaliphatic diamines, aliphatic or cycloaliphatic dicarboxylic acids, lactams and mixtures thereof. The comonomers preferably comprise, mutually independently, from 4 to 18 carbon atoms. Suitable dicarboxylic acids are by way of example adipic acid, sebacic acid and dodecanedioic acid. Suitable diamines are by way of example hexamethylenediamine, decamethylenediamine and dodecamethylenediamine. Lactams such as caprolactam can likewise be used as comonomer.

Preferred comonomers are caprolactam and a polymer made with adipic acid and hexamethylenediamine, preferably in a ratio by mass of 1:1.

An excess of amine groups in the diamines gives copolyamides having reactive amino end groups.

The amine numbers of the copolyamides are preferably from 75 to 400 mmol/kg.

The weight-average molar mass of the copolyamides is preferably in the range from 15 000 to 70 000 g/mol (measured by means of gel permeation chromatography (GPC) against a polystyrene standard). The relative solution viscosity is preferably from 1.2 to 1.8 (determined in accordance with ISO 307).

The copolyamides and the hotmelt adhesive can be used in the inventive compositions in solution, in dispersion or in powder form, preference being given here to the powder form. A suitable solvent is by way of example m-cresol.

The powder form can by way of example be obtained by milling, the grain diameter here with preference being <200 μm, more preferably <100 μm and with particular preference <70 μm (sieve analysis).

In one preferred embodiment of the invention, at least one epoxy component and at least one blocked polyisocyanate have been added to the copolyamide, as other constituents of the hotmelt adhesive.

The epoxy index of the epoxy component is typically from 1 to 2 eq/kg. The epoxy equivalent weight of the epoxy resins used can be from 400 to 4000 g/mol, preferably from 700 to 3000 g/mol and with preference from 875 to 1000 g/mol (determined in accordance with SMS 2026).

The content of OH groups in suitable epoxy resins is preferably 2000 to 4500 mmol/kg, more preferably 2300 to 4000 mmol/kg (method of SMS 2367).

Compounds based on diols or on polyols or dicarboxylic acids can by way of example be used as epoxy component, preference being given here to diols and particular preference being given here to corresponding phenol-diol derivatives. Very particularly preferred phenol-diol derivatives are bisphenols, in particular bisphenol A. The epoxy component is usually obtained by reaction with epichlorohydrin.

The density of suitable epoxy resins is from 1 to 1.3 kg/L, preferably from 1.15 to 1.25 kg/L (25° C.; determined in accordance with ASTM D792). The glass transition temperature (Tg) can be from 20° C. to 100° C., preferably from 25° C. to 90° C., with preference from 40° C. to 60° C. and with particular preference from 45 to 55° C. (determined in accordance with ASTM D3418). The melting range is usually in the range from 45° C. to 150° C. (in accordance with DIN 53181). Suitable epoxy resins are obtainable by way of example as EPIKOTE resin, for example EPIKOTE Resin 1001 or 1009 from Hexion Specialty Chemicals, Inc.

The hotmelt adhesive preferably comprises a proportion of from 2.5 to 10% by weight of the epoxy component, more preferably from 4 to 6% by weight, based in each case on the total weight of the hotmelt adhesive.

The hotmelt adhesive may further comprise hardeners such as dicyandiamide (DCD), preferably in proportions of from 3 to 6% by weight, based on the total weight of the epoxy resin. To accelerate curing, urea derivatives such as monuron or fenuron can be added, and it is thus possible to lower the curing temperatures and/or shorten the curing times.

The proportion of blocked polyisocyanate is preferably from 2.5 to 15% by weight, more preferably from 4 to 6% by weight, based in each case on the total weight of the hotmelt adhesive.

The blocked polyisocyanate component can be aromatic, aliphatic or cycloaliphatic, preference being given here to aliphatic or cycloaliphatic polyisocyanates. Blocking agents for isocyanates such as oximes, phenols or caprolactam are known to the person skilled in the art. It is preferable that, for blocking purposes, the polyisocyanate component takes the form of uretdione. Typical examples are marketed as VESTAGON by Evonik Industries, Germany.

The adhesion promoter composition can comprise self-crosslinking or externally crosslinking binders (in relation to the term "Bindemittel" [Binders] cf. Römpp Lexikon Lacke and Druckfarben [Römpp's Encyclopaedia of Coating Materials and Printing Inks], Georg Thieme Verlag, Stuttgart, N.Y., 1998, Bindemittel, pp. 73 and 74). For the purposes of the present invention, the term "self-crosslinking" denotes the property of a binder of entering into crosslinking reactions with itself. A precondition for this is that complementary reactive functional groups are present in the binders and react with one another and thus lead to crosslinking. Or else the binders comprise reactive functional groups which react "with themselves". Binder systems described as externally crosslinking are in contrast those in which one type of the complementary reactive functional groups is present in the binder and the other type is present in a hardener or crosslinking agent. For additional information here, reference is made to Römpp Lexikon Lacke and Druckfarben, Georg Thieme Verlag, Stuttgart, N.Y., 1998, Hartung [Curing], pp. 274 to 276, in particular lower part of p. 275.

The adhesion promoter composition can moreover comprise electrically conductive substances selected from graphite, carbon black, zinc dust and mixtures of these substances, thus giving electrically conductive adhesion promoter compositions.

The hybrid components comprising coatings of electrically conductive adhesion promoter compositions can be provided with a cathodic electrocoat (CEC).

The adhesion promoter composition may additionally comprise organic solvents. Accordingly, the hotmelt adhesive may be in the form of a solution or dispersion. Suitable solvents are polar or nonpolar organic solvents. Mixtures of polar and nonpolar solvents may likewise be used.

The adhesion promoter compositions can moreover comprise colorants, preferably pigments. Functional pigments such as corrosion-protection pigments can moreover be present.

Suitable hotmelt adhesives are available by way of example as VESTAMELT from Evonik Industries, Germany. Examples include X1027-P1, X1038-P1, X1316 P1 and X1333-P1.

Other materials that can be present alongside the hotmelt adhesive are graft copolymers made of polyamine and of polyamide-forming monomers such as lactams and/or ω-aminocarboxylic acids, as described in EP1065236A2:

The concentration of amino groups in the graft copolymer is preferably in the range from 100 to 2500 mmol/kg.

Examples of substance classes that can be used as polyamine are the following:
polyvinylamines (Römpp Chemie Lexikon [Römpp's Chemical Dictionary], 9th edition, volume 6, page 4921, Georg Thieme Verlag Stuttgart 1992);
polyamines that are produced from alternating polyketones (DE-A 196 54 058);
dendrimers, for example
$((H_2N-(CH_2)_3)_2N-(CH_2)_3)_2-N(CH_2)_2-N((CH_2)_2-N((CH_2)_3-NH_2)_2)_2$ (DE-A-196 54 179) or tris(2-aminoethyl)amine, N,N-bis(2-aminoethyl)-N',N'-bis[2-[bis(2-aminoethyl)amino]ethyl]-1,2-ethanediamine,
3,15-bis(2-aminoethyl)-6,12-bis[2-[bis(2-aminoethyl)amino]ethyl]-9-[2-[bis[2-(2-aminoethyl)amino]ethyl]amino]ethyl]-3,6,9,12,15-pentaazaheptadecane-1,17-diamine (J. M. Warakomski, Chem. Mat. 1992, 4, 1000-1004);

linear polyethyleneimines which can be produced by polymerization of 4,5-dihydro-1,3-oxazoles followed by hydrolysis (Houben-Weyl, Methoden der Organischen Chemie [Methods for Organic Chemistry]), vol. E20, pp. 1482-1487, Georg Thieme Verlag Stuttgart, 1987);

branched polyethyleneimines which are obtainable by polymerization of aziridines (Houben-Weyl, Methoden der Organischen Chemie), vol. E20, pp. 1482-1487, Georg Thieme Verlag Stuttgart, 1987) and which generally have the following amino group distribution:
from 25 to 46% of primary amino groups,
from 30 to 45% of secondary amino groups and
from 16 to 40% of tertiary amino groups.

In the preferred case the number-average molar mass $M_n$ of the polyamine is at most 20 000 g/mol, more preferably at most 10 000 g/mol and especially preferably at most 5000 g/mol.

Lactams and ω-aminocarboxylic acids which can be used as polyamide-forming monomers comprise from 4 to 19 carbon atoms, in particular from 6 to 12. It is particularly preferable to use ∈-caprolactam and laurolactam or the relevant ω-aminocarboxylic acids. The molar ratio of C12 to C6 unit is preferably from 4:1 to 1:4. The ratio by mass of hotmelt adhesive to graft copolymer is preferably from 19:1 to 1:1.

In the simplest case, the functionalized polyolefin is polypropylene-based. However, ethylene/$C_3$-$C_{12}$-α-olefin copolymers are also suitable. An example of a $C_3$-$C_{12}$-α-olefin used is propene, 1-butene, 1-pentene, 1-hexene, 1-octene, 1-decene or 1-dodecene. The ethylene/$C_3$-$C_{12}$-α-olefin copolymers can moreover also comprise up to at most 10% by weight of olefin dienes such as ethylidenenorbornene or 1,4-hexadiene. Functionalization is preferably provided by acid anhydride groups, these being introduced in a known manner through thermal or free-radical reactions of the main-chain polymer with an unsaturated dicarboxylic anhydride or with an unsaturated dicarboxylic acid. Examples of suitable reagents are maleic anhydride and itaconic anhydride. The quantity grafted onto the material in this method is from 0.1 to 4% by weight, based on the total weight of the functionalized polyolefins, and another monomer such as styrene can also be used here.

Maleic acid-grafted polyolefins are widely used for industrial applications, in particular for impact modifications or as compatibilizers in blends and mechanically reinforced systems (Polymer, 2001, 42, 3649-3655 and literature cited). The source mentioned also describes by way of example the production of functionalized polyolefins of this type.

A typical representative of a functionalized polyolefin is the polypropylene-based, acid anhydride-grafted material Admer QB 520 E (Mitsui Chemicals). It is also possible in principle to use maleic acid-grafted polypropylenes from Kometra (e.g. SCONA TPPP 8012), these being more free-flowing.

Another possible functionalization method consists in the mixing, in the melt, of unfunctionalized polyolefins with reactive compatibilizers which comprise epoxy or carboxylic anhydride groups. Typical examples are copolymers composed of ethylene and of one or more unreactive acrylic monomers with maleic anhydride or glycidyl methacrylate. Lotader AX8900 (Arkema) is a typical representative material having glycidyl methacrylate units.

The ratio of polyamide component to polyolefin component is from 9:1 to 2:3.

Even in the absence of further information it is assumed that a person skilled in the art can make very extensive use of the above description. The preferred embodiments and examples are therefore to be interpreted merely as descriptive disclosure, and certainly not as disclosure that is in any way limiting.

The present invention is explained in more detail below with reference to examples. Alternative embodiments of the present invention are obtainable analogously.

EXAMPLES

Unpretreated sheets of various metal alloys were pretreated with converting agents. The following converting agents were used:
A: Granodine 958 A from Henkel, Germany, comprising inter alia phosphoric acid and zinc bis(dihydrogenphosphate)
B: Granodine 958 A from Henkel, Germany, additionally comprising 170 ppm Grano Toner 38 from Henkel, Germany (component comprising fluoride and hydrogendifluoride anions),
C: Granodine 1455 T from Henkel, Germany, comprising inter alia phosphoric acid and dihydrogenhexafluorotitanate, and
D: Alodine 4595 from Henkel, Germany, comprising inter alia dihydrogenhexafluorozirconate.

The following metal alloys were used:
M1: HDG EA (sheet thickness 0.6 mm) to DIN EN10142
M2: DX56D Z140 (sheet thickness 1.0 mm) to DIN EN10346
M3: DX51D Z140 (sheet thickness 1.0 mm) to DIN EN10346
M4: AlMg3 EN AW-5754 H111 to DIN EN 573-3
M5: Steel ZSTE 800 to DIN EN10142

The conversion solution was applied in accordance with manufacturer's instructions by means of immersion into the solutions and drying of the layers, and then the metal samples were coated with an adhesion promoter composition. The composition applied comprised
I: Copolyamide-based hotmelt adhesive comprising an epoxy component and a blocked polyisocyanate in the form of powder coating,
II: Solvent-containing spray coating A comprising 29% by weight of a copolyamide-based hotmelt adhesive comprising an epoxy component and a blocked polyisocyanate and
III: Solvent-containing spray coating B comprising 30% by weight of a copolyamide-based hotmelt adhesive comprising an epoxy component and a blocked polyisocyanate.
IV: Copolyamide-based hotmelt adhesive (Vestamelt Z2366-P1 from Evonik Industries AG) comprising an epoxy component and a blocked polyisocyanate, and also a functionalized polyolefin, as powder coating.

The four compositions 1 to 4 comprise the same hotmelt adhesives.

The coating system was applied by the spray process with a layer thickness of from 50 to 70 μm, and the powder coating was applied electrostatically with a layer thickness of from 50 to 100 μm. The spray coating system and powder coating were stoved at 150° C. for 5 min. For this purpose, the coated metal sheets were placed in a preheated autoclave (oven).

After the stoving procedure, guillotine shears were used to cut the metal sheets into strips fitting the injection moulding cavity with dimensions 24.9 mm×59.8 mm (tolerance ±0.2 mm).

For production of the final hybrid components, the strips were then placed in a temperature-controlled injection mould and in-mould-coated with a thermoplastic. The following moulding compositions were used as plastics component:

K1: PA6GF30 Durethan BKV30 H2.0 from LANXESS Deutschland GmbH
K2: PA610GF30 VESTAMID Terra HS1850 from Evonik Industries AG
K3: PA1010GF65 VESTAMID Terra BS1429 from Evonik Industries AG
K4: PA12GF30 VESTAMID L-GF30 from Evonik Industries AG.
K5: VESTAMID LX9012 from Evonik Industries AG
K6: PA6TGF50 VESTAMID HTplus M1035 from Evonik Industries AG
K7: PACM12 TROGAMID CX7323 from Evonik Industries AG
K8: PPLGF30 Celstran PP-GF30-05CNO1 from TICONA
K9: PA6.6 Durethan A30S from LANXESS Deutschland GmbH
K10 PBTGF30 VESTODUR GF30 from Evonik Industries AG The plastics were processed in an Allrounder 420 (screw diameter 25 mm) at a melt temperature of 280° C., a mould temperature of 80° C. or 120° C., and an injection rate of about 30 ccm/s. However, for the PPAGF50 and PPLGF30, mould temperatures were 120° C. and 70° C. respectively, and melt temperatures used were 335° C. and 270° C. respectively. It was important here to provide an injection delay of about 30 s, so that the metal sheet strip inserted could be preheated to mould temperature, giving a favourable effect on adhesion. After demoulding, the individual tensile shear test samples were separated from the sprue.

The test samples used had the following physical features:

| Type | Length in mm | Width in mm | Overlap in mm² | Thickness of metal sheet in mm | Thickness of plastics component |
|---|---|---|---|---|---|
| 1 | 130 | 25 | 25 × 25 | 0.6 or 1 | 4 mm |
| 2 | 130 | 25 | 12.5 × 25 | 0.6 or 1 | 4 mm |
| 3 | 100 | 20 | 20 × 20 | 1.5 | 6 mm (4 mm in the overlap region) |

The test samples thus produced were stored at 50% relative humidity for at least 24 h at 23° C. in order to ensure a uniform state of conditioning. The test samples are then clamped into a standard Zwick/Roell Z-020 tensile tester and tested with a velocity of 5 mm/min at 23° C. with a distance between the clamps and the overlap region of about 15 mm/side.

| Steel | CA | AP | Plastic | Temp. in ° C. | Overlap in mm | Bond strength in MPa |
|---|---|---|---|---|---|---|
| M1* | none | I | K1 | 80 | 25 × 25 | 1.2 |
| M1 | A | I | K1 | 80 | 25 × 25 | 4.1 |
| M1 | B | I | K1 | 80 | 25 × 25 | 7.2 |
| M1* | none | I | K1 | 120 | 25 × 25 | 1.7 |
| M1 | A | I | K1 | 120 | 25 × 25 | 6.7 |
| M1 | B | I | K1 | 120 | 25 × 25 | 8.4 |
| M1 | A | II | K1 | 120 | 25 × 25 | 5.3 |
| M1 | B | II | K1 | 120 | 25 × 25 | 6.2 |
| M2 | C | II | K1 | 120 | 25 × 25 | 7.4 |
| M1 | A | III | K1 | 120 | 25 × 25 | 8.0 |
| M1 | B | III | K1 | 120 | 25 × 25 | 8.3 |
| M2 | C | III | K1 | 120 | 25 × 25 | 8.8 |
| M1 | A | I | K1 | 80 | 12.5 × 25 | 11.2 |
| M1 | B | I | K1 | 80 | 12.5 × 25 | 13.1 |
| M1 | A | II | K1 | 80 | 12.5 × 25 | 13.9 |
| M1 | B | II | K1 | 80 | 12.5 × 25 | 14.9 |
| M1 | A | I | K9 | 80 | 12.5 × 25 | 5.8 |
| M1 | B | I | K9 | 80 | 12.5 × 25 | 6.5 |
| M1 | A | I | K3 | 80 | 12.5 × 25 | 11.9 |
| M1 | B | I | K3 | 80 | 12.5 × 25 | 12.6 |
| M1 | A | II | K3 | 80 | 12.5 × 25 | 13.5 |
| M1 | B | II | K3 | 80 | 12.5 × 25 | 14.1 |
| M4 | A | II | K3 | 80 | 12.5 × 25 | 11.2 |
| M4 | B | II | K3 | 80 | 12.5 × 25 | 12.5 |
| M4 | A | II | K6 | 120 | 12.5 × 25 | 7.9 |
| M4 | B | II | K6 | 120 | 12.5 × 25 | 10.2 |
| M4 | A | I | K10 | 80 | 12.5 × 25 | 2.2 |
| M4 | B | I | K10 | 80 | 12.5 × 25 | 4.5 |
| M4 | D | I | K10 | 80 | 12.5 × 25 | 3.9 |
| M4* | none | II | K1 | 80 | 12.5 × 25 | 2.3 |
| M4 | A | II | K1 | 80 | 12.5 × 25 | 7.7 |
| M4 | B | II | K1 | 80 | 12.5 × 25 | 13.7 |
| M4 | D | II | K1 | 80 | 25 × 25 | 7.5 |
| M4 | D | III | K1 | 80 | 25 × 25 | 7.2 |
| M4 | D | II | K1 | 120 | 25 × 25 | 8.2 |
| M4 | D | III | K1 | 120 | 25 × 25 | 7.8 |
| M3* | B | none | K2 | 80 | 12.5 × 25 | n.m. |
| M3 | B | I | K2 | 80 | 12.5 × 25 | 11.3 |
| M3 | B | II | K2 | 80 | 12.5 × 25 | 14.7 |
| M4* | B | none | K2 | 80 | 12.5 × 25 | n.m. |
| M4 | B | I | K2 | 80 | 12.5 × 25 | 16.0 |
| M4 | B | II | K2 | 80 | 12.5 × 25 | 15.5 |
| M3* | B | none | K3 | 80 | 12.5 × 25 | n.m. |
| M3 | B | II | K3 | 80 | 12.5 × 25 | 15.7 |
| M4* | B | none | K3 | 80 | 12.5 × 25 | n.m. |
| M4 | B | II | K3 | 80 | 12.5 × 25 | 7.9 |
| M3* | B | none | K1 | 80 | 12.5 × 25 | n.m. |
| M3 | B | I | K1 | 80 | 12.5 × 25 | 13.8 |
| M3 | B | II | K1 | 80 | 12.5 × 25 | 12.3 |
| M4* | B | none | K1 | 80 | 12.5 × 25 | n.m. |
| M4 | B | I | K1 | 80 | 12.5 × 25 | 13.0 |
| M4 | B | II | K1 | 80 | 12.5 × 25 | 13.9 |
| M4* | B | none | K5 | 80° C. | 25 × 25 | n.m. |
| M4 | B | I | K5 | 80° C. | 25 × 25 | 4.5 |
| M3* | B | none | K6 | 120° C. | 12.5 × 25 | 1 |
| M3 | B | II | K6 | 120° C. | 12.5 × 25 | 11.9 |
| M3* | B | none | K7 | 80° C. | 12.5 × 25 | n.m. |
| M3 | B | I | K7 | 80° C. | 25 × 25 | 4.8 |
| M3 | B | II | K7 | 80° C. | 25 × 25 | 3.7 |
| M4* | B | none | K8 | 70° C. | 12.5 × 25 | n.m. |
| M4 | B | IV | K8 | 70° C. | 12.5 × 25 | 5.8 |
| M5* | B | none | K4 | 80° C. | 20 × 20 | n.m. |
| M5 | B | I | K4 | 80° C. | 20 × 20 | 8.8 |
| M5 | B | II | K4 | 80° C. | 20 × 20 | 10.6 |

*non-inventive
n.m. = not measurable (no adhesion)
CA: converting agent;
AP: adhesion promoter composition;
Temp: mould temperature The results show that the coating composed of conversion layer and adhesion promoter layer can achieve increased bond strength between metal and plastic in hybrid components compared to systems without a conversion layer. Bond strength is increased especially in the case of use of halide-containing, preferably fluoride-containing, converting agents (converting agents B and C).

The invention claimed is:

1. A process for producing a hybrid component comprising metal and plastic, the process comprising:
   pretreating a metal surface by applying at least one conversion layer;
   applying at least one layer of an adhesion promoter composition; and
   bonding the metal to the plastic,
   wherein the adhesion promoter composition comprises at least one copolyamide-based hotmelt adhesive and does not comprise a functionalized polyolefin, and
   the hybrid component has a bond strength in a range of from 6.2 to 16.0 MPa.

2. The process of claim 1, wherein the copolyamide-based hotmelt adhesive comprises a copolyamide, at least one epoxy component, and at least one blocked polyisocyanate.

3. The process of claim 1, wherein the plastic has been reinforced.

4. The process of claim 3, wherein the plastic has been reinforced by fibers.

5. The process of claim 1, wherein a converting agent is used to produce the conversion layer.

6. The process of claim 5, wherein the converting agent comprises halides.

7. The process of claim 6, wherein the converting agent comprises fluorides.

8. The process of claim 5, wherein the converting agent comprises halide salts, complex halides or mixtures thereof.

9. The process of claim 1, wherein in the bonding, the plastic is applied to the coated metal by injection moulding, pressing, laminating, in-mould coating or (co)extrusion.

10. The process of claim 1, wherein the conversion layer is obtained by a process comprising treating the metal surface with a plasma jet produced by using an operating gas and/or a flame jet produced by using a combustion gas, wherein at least one precursor material is introduced into the operating gas and/or the plasma jet or into the combustion gas and/or the flame jet such that the precursor material is reacted in the plasma jet or flame jet to form a reaction product and that the reaction product is deposited on the metal surface and/or on at least one layer disposed on the metal surface to coat the metal surface and/or the at least one layer.

11. The process of claim 1, wherein the metal comprises an iron-containing alloy.

12. The process of claim 1, wherein the metal comprises steel.

13. The process of claim 1, wherein the plastic comprises at least one selected from the group consisting of a polybutylene terephthalate, a polyolefin, a polycarbonate, a polyurethane, an aliphatic or semiaromatic polyamide, acrylonitrile-butadiene-styrene, and polymethylmethacrylate.

14. The process of claim 1, wherein the at least one copolyamide-based hotmelt adhesive in the adhesion promoter composition comprises a copolyamide, an epoxy component, and a blocked polyisocyanate.

\* \* \* \* \*